United States Patent [19]

Oka

[11] Patent Number: 5,086,462
[45] Date of Patent: Feb. 4, 1992

[54] TERMINAL REPEATER HAVING A FUNCTION FOR REPEATING DC LOOP SIGNAL

[75] Inventor: Tosho Oka, Hino, Japan

[73] Assignee: Kabushiki Kaisha Toshiba, Kawasaki, Japan

[21] Appl. No.: 711,268

[22] Filed: Jun. 4, 1991

Related U.S. Application Data

[63] Continuation of Ser. No. 610,326, Nov. 8, 1990, abandoned, which is a continuation of Ser. No. 358,306, May 30, 1989, abandoned.

[30] Foreign Application Priority Data

May 30, 1988 [JP] Japan .............................. 63-132320

[51] Int. Cl.$^5$ .............................................. H04M 1/00
[52] U.S. Cl. .................................. 379/340; 379/338; 379/413
[58] Field of Search ............... 379/338, 339, 340, 341, 379/342, 343, 344, 345, 346, 347, 348, 349, 403, 324, 382, 377, 386, 399, 413, 383, 401, 402, 96; 340/425

[56] References Cited

U.S. PATENT DOCUMENTS

| 3,166,642 | 1/1965 | Abbott | 379/342 |
|---|---|---|---|
| 3,916,110 | 10/1975 | Lee et al. | 379/413 |
| 4,251,691 | 2/1981 | Kakihara et al. | 379/96 |
| 4,623,760 | 11/1986 | Binkerd et al. | 379/232 |
| 4,802,207 | 1/1989 | Uchida | 379/377 X |
| 4,811,389 | 3/1989 | Balch | 379/377 |

FOREIGN PATENT DOCUMENTS 0171892 9/1985 Japan .................................. 379/339

Primary Examiner—James L. Dwyer
Assistant Examiner—Jhancy Augustus
Attorney, Agent, or Firm—Finnegan, Henderson, Farabow, Garrett, and Dunner

[57] ABSTRACT

A terminal repeater placed in at least one communication line connecting an exchange and at least one terminal device, comprising a DC cut-off circuit providing continuous paths for AC signals flowing through the lines while providing discontinuous paths for DC signals flowing through the communication line, a DC power supply circuit generating a DC power used in place of a DC power supplied through communication line from the exchange, and supplying the generated DC power to terminal device, a DC loop signal detecting circuit comparing a threshold level with a level of a DC loop signal as is transmitted from the terminal device to the exchange, and generating a signal corresponding to the DC loop signal, and a pseudo-DC loop signal transmitting circuit, when the DC loop signal detecting circuit generates a signal, the pseudo-DC loop signal transmitting circuit controlling a C state of the communication line in accordance with the signal generated by the DC loop signal detecting circuit, thereby to transmit a pseudo-DC loop signal analogous to the DC loop signal detected by the DC loop signal detecting circuit.

12 Claims, 14 Drawing Sheets

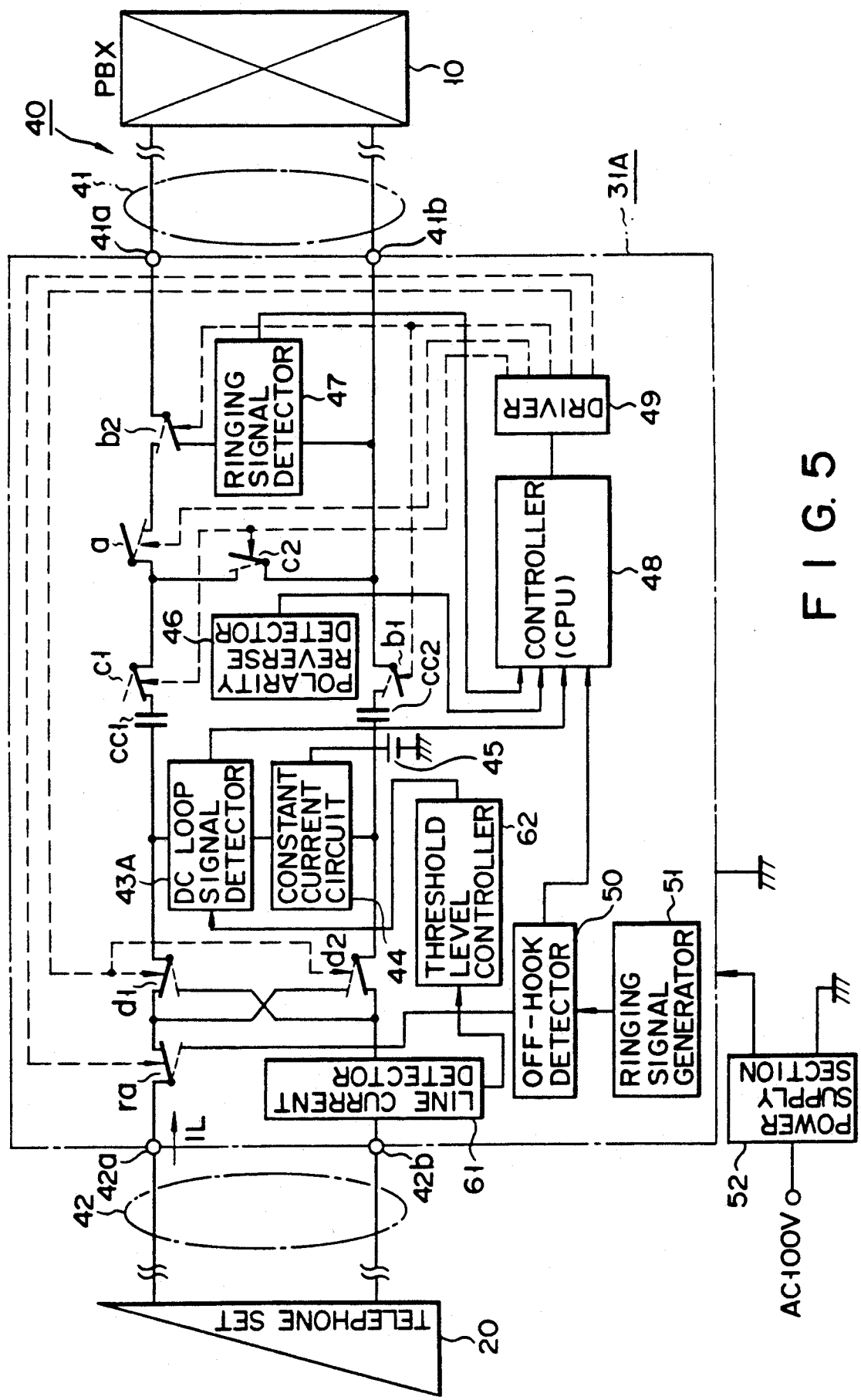
F I G. 5

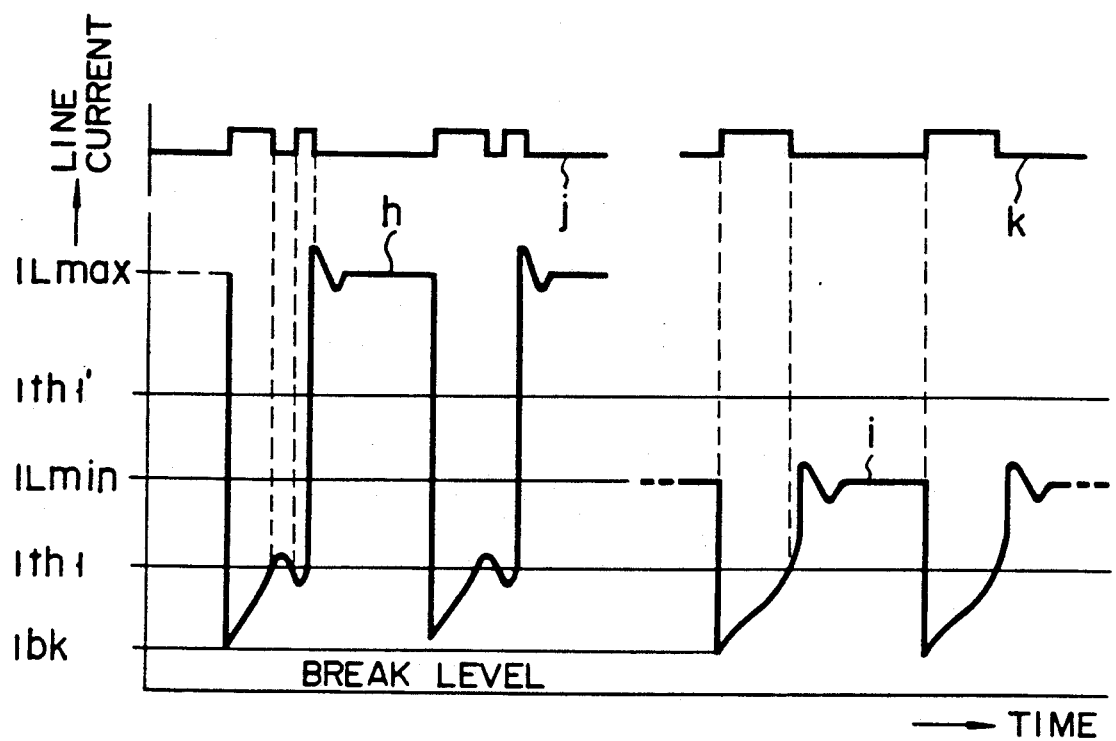
F I G. 7A
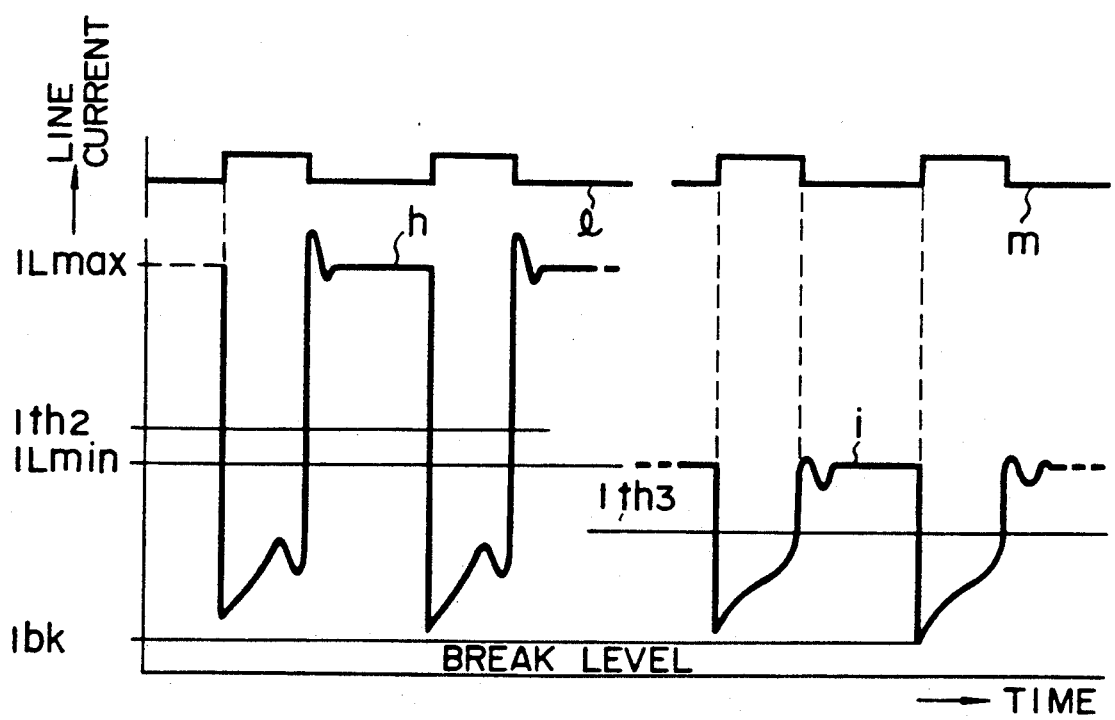
F I G. 7B

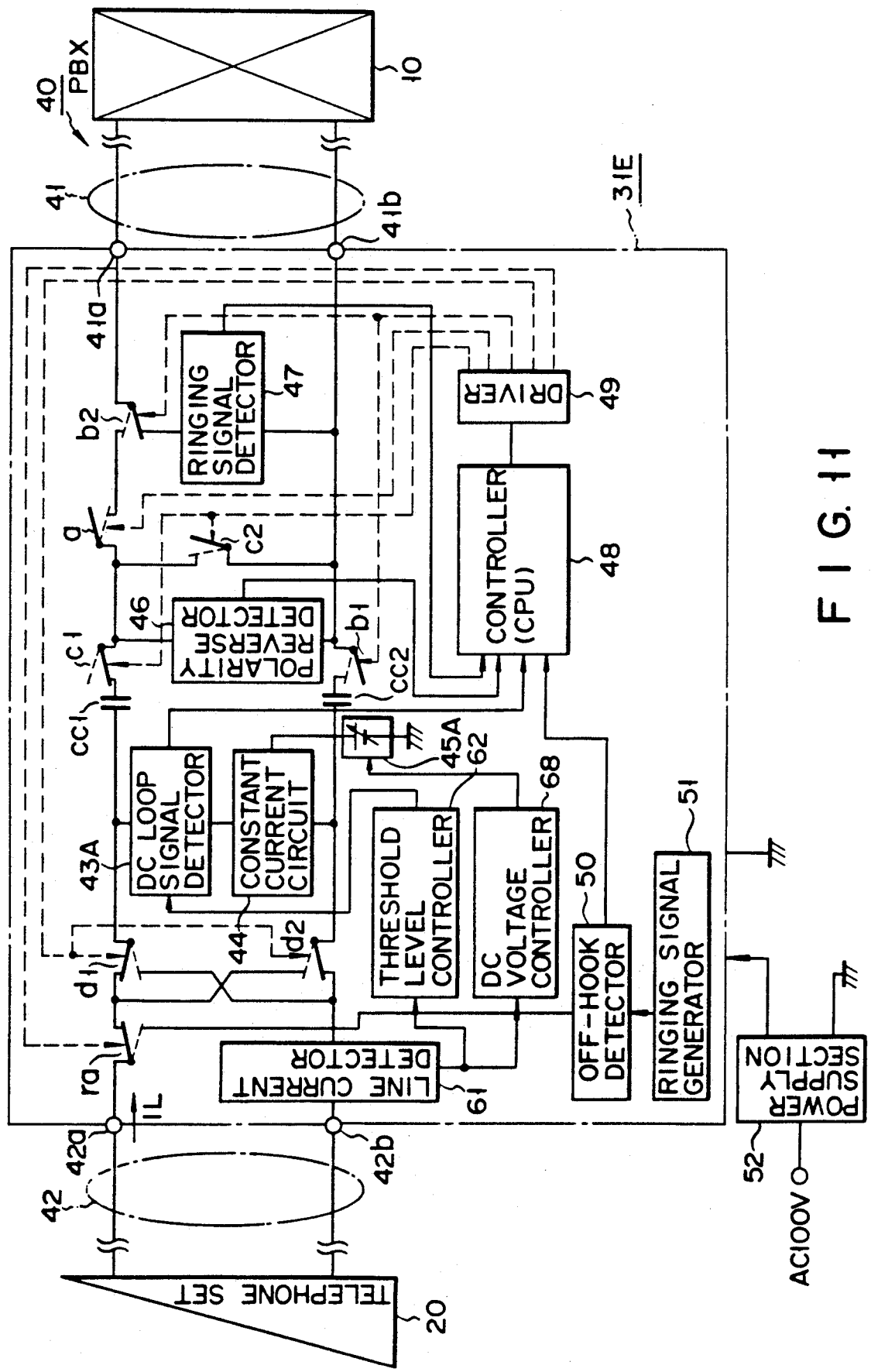
F I G. 11

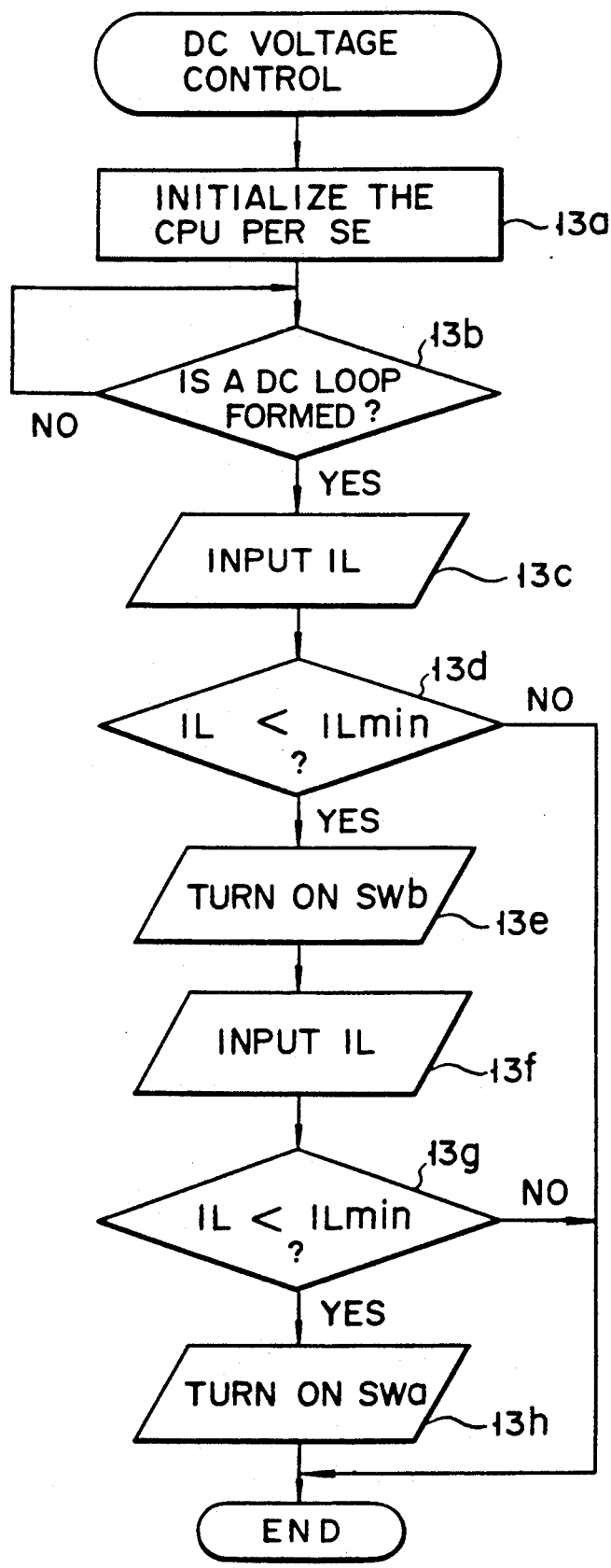
F I G. 13

TERMINAL REPEATER HAVING A FUNCTION FOR REPEATING DC LOOP SIGNAL

This application is a continuation of application Ser. No. 07/610,326, filed Nov. 8, 1990 now abandoned, which is a continuation of application Ser. No. 07/358,306, filed May 30, 1989 now abandoned.

BACKGROUND OF THE INVENTION

1. Field of the Invention

The present invention relates to a terminal repeater inserted in a line between an exchange and each terminal device.

2. Description of the Related Art

In a telephone network, private branch exchanges (PBXs) are contained each of which routes incoming calls to desired terminal devices such as telephones and facsimiles by way of telephone lines of wires. In a local network of this type, some terminal devices remotely located often require extremely long telephone lines to connect them to the PBX. In such a case, the telephone lines have large resistance, and the length greatly attenuates speech signals, and consequently degrades speech quality.

To cope with the line loss, repeaters are inserted in long telephone lines to compensate for the line loss. A conventional terminal repeater is provided with a couple of 2 wire-4 wire converting circuits, one installed at the input and the other at the output. The converting circuit contains two paths, incoming and outgoing paths. Amplifiers with AGC functions for compensating the line loss are inserted in the incoming and outgoing signal paths, respectively. A speech signal, for example enters the converting circuit and enters either of the two incoming and outgoing paths. It is amplified by the amplifier contained in the path and leaves the converting circuit to its destination, the PBX or a terminal device.

Thus, the conventional repeater simply amplifies the incoming signal and outputs it to the exterior intact. In the case of a signal containing noise and distortion, these components, together with the signal component, are also amplified. Accordingly, no improvement of the S/N ratio and line quality can be attained. Particularly, when much distortion is contained in DC loop signals utilizing the on-off of the DC loop formed in the communication line, such as seizure signals, off-hook signals, and dial pulses, the PBX mistakenly discriminates those signals one from the other and makes an improper exchange.

SUMMARY OF THE INVENTION

Accordingly, an object of the present invention is to provide a terminal repeater in a telephone network which can repeat DC loop signals at a satisfactorily high level and with less distortion even if communication lines coupled with it are long and have large line resistance.

To achieve the above object, there is provided a terminal repeater placed in the communication lines connecting an exchange and each terminal device, comprising: a DC cut-off circuit for passing AC signals flowing through the communication lines and cutting off DC signals flowing through the communication lines;

DC power supply circuit, provided between the DC cut-off circuit and the terminal device, for supplying DC power to the terminal device through the communication line between the DC cut-off circuit and the terminal device, achieving a function corresponding to a DC power supplied through the communication lines from the exchange;

DC loop signal detecting circuit for comparing a threshold level with a level of a DC loop signal as is transmitted from the terminal device to the exchange, and generating a DC loop detecting signal corresponding to the DC loop signal; and Pseudo-DC loop signal transmitting circuit for generating, a pseudo-DC loop signal analogous to the DC loop signal transmitted from the terminal device in response to the DC loop detecting signal derived from the DC loop signal detecting circuit, through the communication line between the DC cut-off circuit and the exchange, and transmitting the pseudo-DC loop signal to the exchange.

With such an arrangement, the terminal device and the exchange are disconnected from each other in a DC mode. The DC power supply circuit contained in the terminal repeater supplies a DC power necessary for the terminal device. Even a terminal device that is remotely located from and connected to the exchange by long communication lines, can constantly secure a DC power of a rated value with the aid of the DC supply circuit. Accordingly, any remote terminal device is normally operable with a proper DC power.

The repeater replaces the DC loop signals such as dial pulses, seizure and answer signals transmitted from the exchange, by those signals generated by the pseudo-DC loop signal transmitting circuit, and returns those pseudo-DC loop signals to the exchange. The repeater can always return the DC loop signals to the exchange, regardless of level drop, signal distortion, and the like. Therefore, when using a terminal repeater according to the present invention, there is solved the problem that the exchange makes an improper connection due to level drop, signal distortion and the like of the DC loop signals, that are inevitable in those repeaters remotely located.

Other objects, advantages and features of the present invention will be apparent from the following detailed description that will be given in connection with the accompanying drawings, in which:

BRIEF DESCRIPTION OF THE DRAWINGS

FIG. 5 is a circuit diagram showing a configuration of a terminal repeater according to another embodiment of the present invention;

FIGS. 7A and 7B show timing charts useful in explaining the operation of the repeater of FIG. 5;

FIG. 11 is a circuit diagram showing a configuration of a terminal repeater according to a further another embodiment of the present invention;

FIG. 13 is a flow chart showing controls by a control unit used in the repeater of FIG. 11.

DETAILED DESCRIPTION OF THE PREFERRED EMBODIMENTS

1st Embodiment

Figure 1:
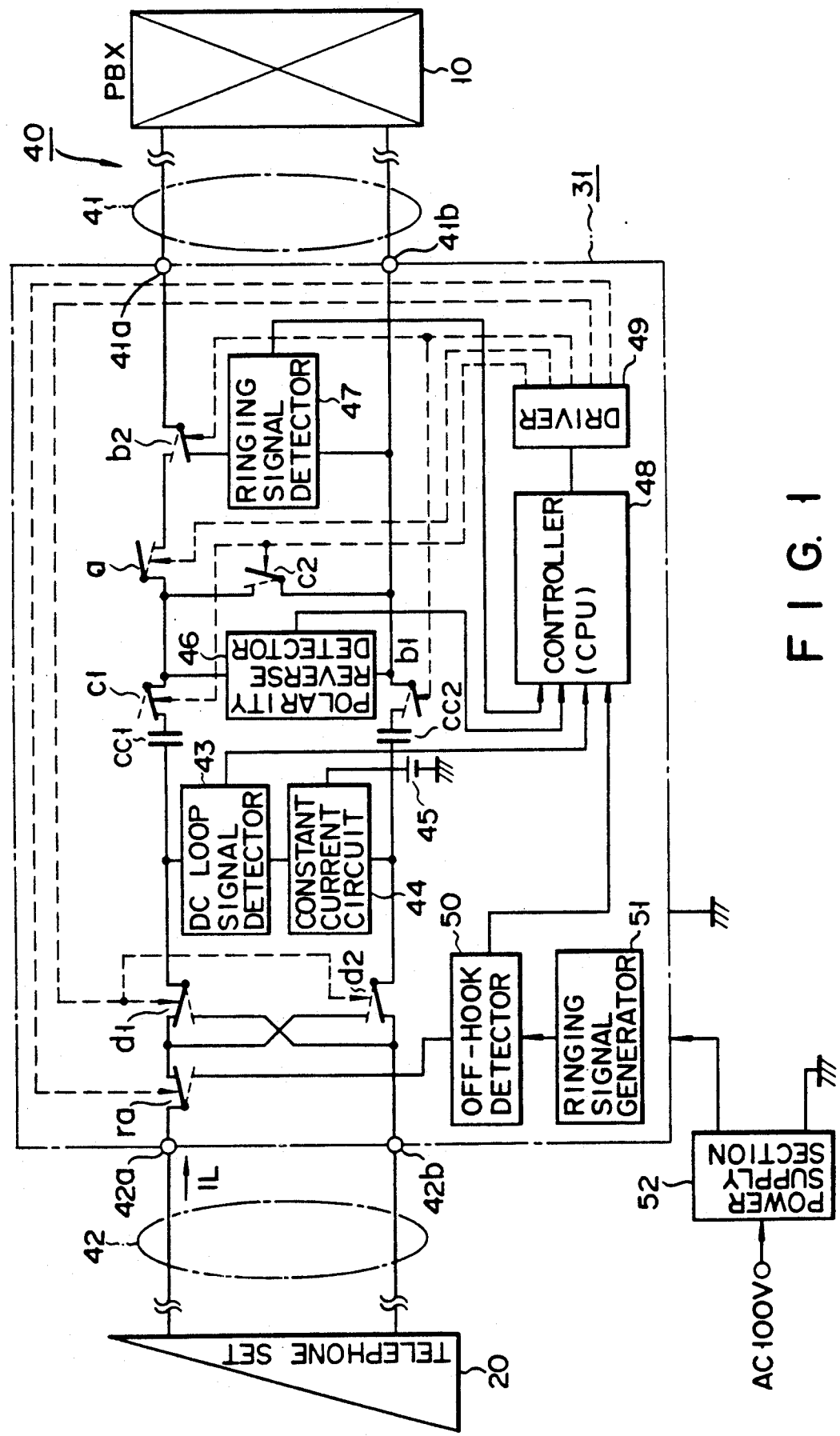
FIG. 1 is a circuit diagram showing a configuration of a terminal repeater according to an embodiment of the present invention.

A terminal repeater according to a first embodiment of the present invention is configured as shown in FIG. 1. As shown, the repeater denoted as 31 is placed in a 2-wire extension 40 which interconnects a private branch exchange (PBX) 10 and each telephone set 20 as a terminal. In this instance, the 2-wire extension 40 consists of two 2-wire lines, one 2-wire line 41 interconnecting the exchange 10 and the repeater 31, and a second 2-wire line 42 interconnecting the repeater 31 and the telephone set 20.

Within the repeater 31, coupling capacitors cc1 and cc2 are respectively inserted in the two wires of the extension 40. These capacitors decouple the line 41 connected to the PBX 10 from the line 42 connected to the telephone set 20 in a DC mode. An answer contact b2, dial contact "a" and shunt contact c1 are connected in series between the capacitor cc1 and a terminal 41a of the line 41. An answer contact b1 is inserted between the capacitor cc2 and another terminal 41b of the line 41. Another shunt contact c2 is connected between the terminal 41b and a node between the dial contact "a" and the shunt contact c1. These contacts, "a", b1, b2 and c1 are normally-open relay contacts that are driven by a driver 49.

A ringing signal detector 47 is connected to the terminal 41b and to the fixed contact of the answer contact b2 which is normally closed and connects the detector 47 to the terminal 41a. The detector 47 supervises a ringing signal that will come in through the line 41 from the PBX 10. When detecting a ringing signal, the detector 47 produces a call detect signal as an AC signal at 16Hz and 75V in which a combination of 1-sec. continuation and 2-sec. interruption is alternately repeated. A polarity reverse detector 46 is coupled across shunt contact c2. The detector 46 supervises a polarity reverse occurring between the two wires of the line 41 that is caused by the PBX 10 when it makes an exchange connection. When detecting a polarity reverse, it produces a polarity reverse detect signal.

A ringing signal send contact "ra" and a polarity reverse contact d1 are connected in series between a terminal 42a of the line 42 connecting to the telephone set 20, and the coupling capacitor cc1. Another polarity reverse contact d2 is inserted between a terminal 42b of the line 42 and the coupling capacitor cc2. Those contacts "ra", d1 and d2 are normally close relay contacts driven also by the contact driver 49. The fixed contacts of those contacts that are normally open, are cross connected in such a way that the fixed contact in one of the paired wires of the line 40 is connected to the other wire, and vice versa. The fixed contact of the ringing signal send contact "ra" is connected to a ringing signal generator 51 via an answer detector 50. The ringing signal generator 51 generates a pseudo-ringing signal analogous to a ringing signal sent from the PBX 10. The pseudo-ringing signal to be transmitted to the telephone set 20 is an AC signal interrupted by the contact "ra" in such a manner that a combination of 1-sec. continuation and 2-sec. interruption is alternately repeated. The off-hook detector 50, when being connected to the line 42 through the contact "ra", detects an off-hook signal of the telephone set 20.

Within the repeater 31, a DC loop signal detector 43 and a constant current circuit 44 are coupled in series between two wires of the 2-wire line 40. The DC loop current detector 43 detects DC loop currents, such as a seizure signal, dial pulse, and off-hook signal, that come from the telephone set 20 through the line 42. For the detection of the loop currents, a line current IL is compared with a preset threshold current Ith in a condition that a DC loop is set up in the line 42. The constant current circuit 44 converts a DC power from a DC power source 45 into a constant current and then feeds the constant current to the line 42. A value of the constant current is set at about 40 mA, in order to prevent the feed of an over current to the telephone set 20. The constant current is used in place of the DC current fed from the PBX 10 to the telephone set 20. A voltage EO of the DC power source 45 is selected as given below $$EO > (RL_{max} + RTEL) \times IL_{min}$$

where

RLmax : Maximum line resistance of the line,
RTEL : Internal resistance of the telephone set,
ILmin : Minimum DC current necessary for the operation of the telephone set.

The voltage E0 so selected can cause the necessary current ILmin to feed to the telephone set 20 even when the line resistance of the line 42 is at maximum.

The terminal repeater 31 contains a central processing unit (CPU) 48 as a main controller. The CPU 48 controls the repeating operation of the repeater between the telephone set 20 and the PBX 10, under control of a control program previously stored therein. The CPU 48 receives the signals from the DC loop signal detector 43, polarity reverse detector 46, ringing signal detector 47, and off-hook signal detector 50, and produces control signals to the driver 49 for driving the contacts a, b1, b2, c1, c2, d1, d2, and ra. The contact driver 49, which is made up of a relay, is energized by the control signals from the CPU 48 to control the opening and closing of its related contacts.

A power supply section 52 forms a DC power required to drive the repeater 31 per se by using a commercial AC power of 100 V.

Figure 2:
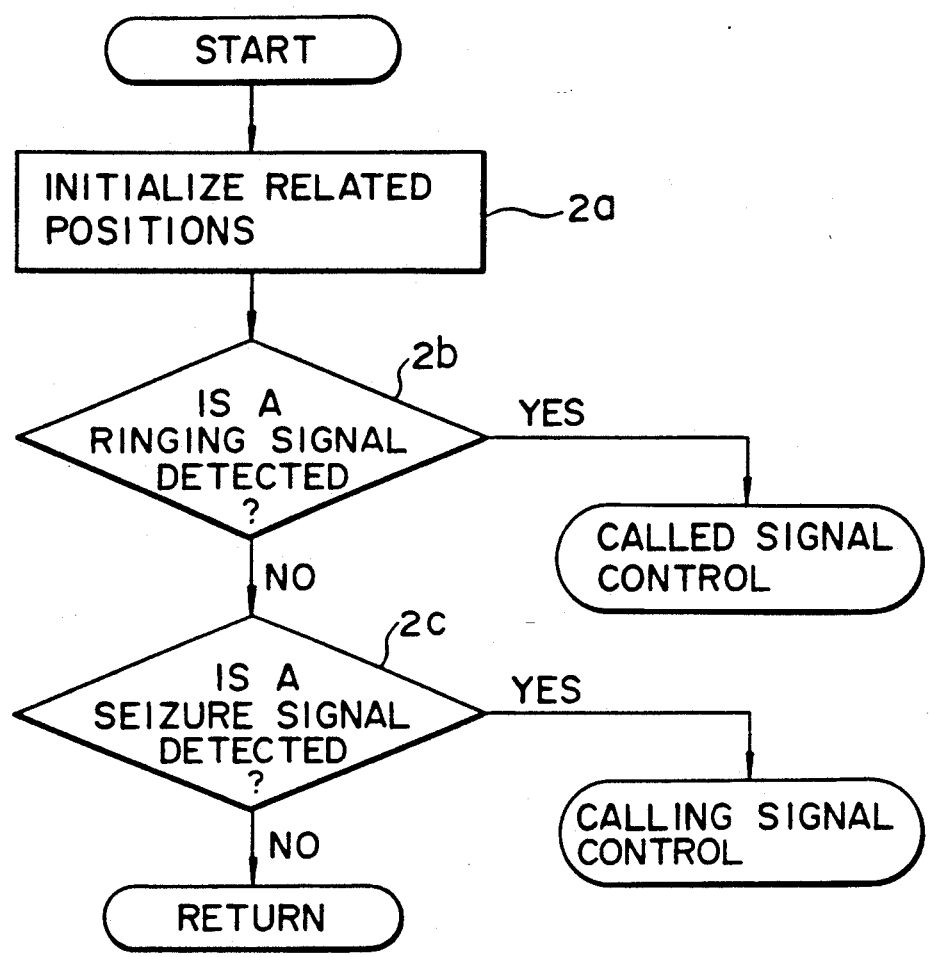
FIGS. 2 to 4 are flowcharts showing controls by a control unit used in the repeater of FIG. 1.

The operation of the terminal repeater 31 thus arranged will be described. To start, a power switch (not shown) of the repeater 31 is turned on. The CPU 48 initializes the related portions in the repeater 31 in step 2a, as shown in FIG. 2. As the result of initializing, the dial contact "a", answer contacts b1 and b2, and shunt contacts c1 and c2 are in an open state, while the polarity reverse contacts d1 and d2, and ringing signal send contact "ra" are in a closed state. The line 41 is terminated by the ringing signal detector 47. Accordingly, the repeater 31 is ready for receiving a ringing signal. The DC power source 45 and the constant current circuit 44 generate a DC power and a DC current, respectively, which in turn are supplied to the telephone set 20 through the line 42. Under this condition, the telephone set 20 is in operation.

Figure 3:
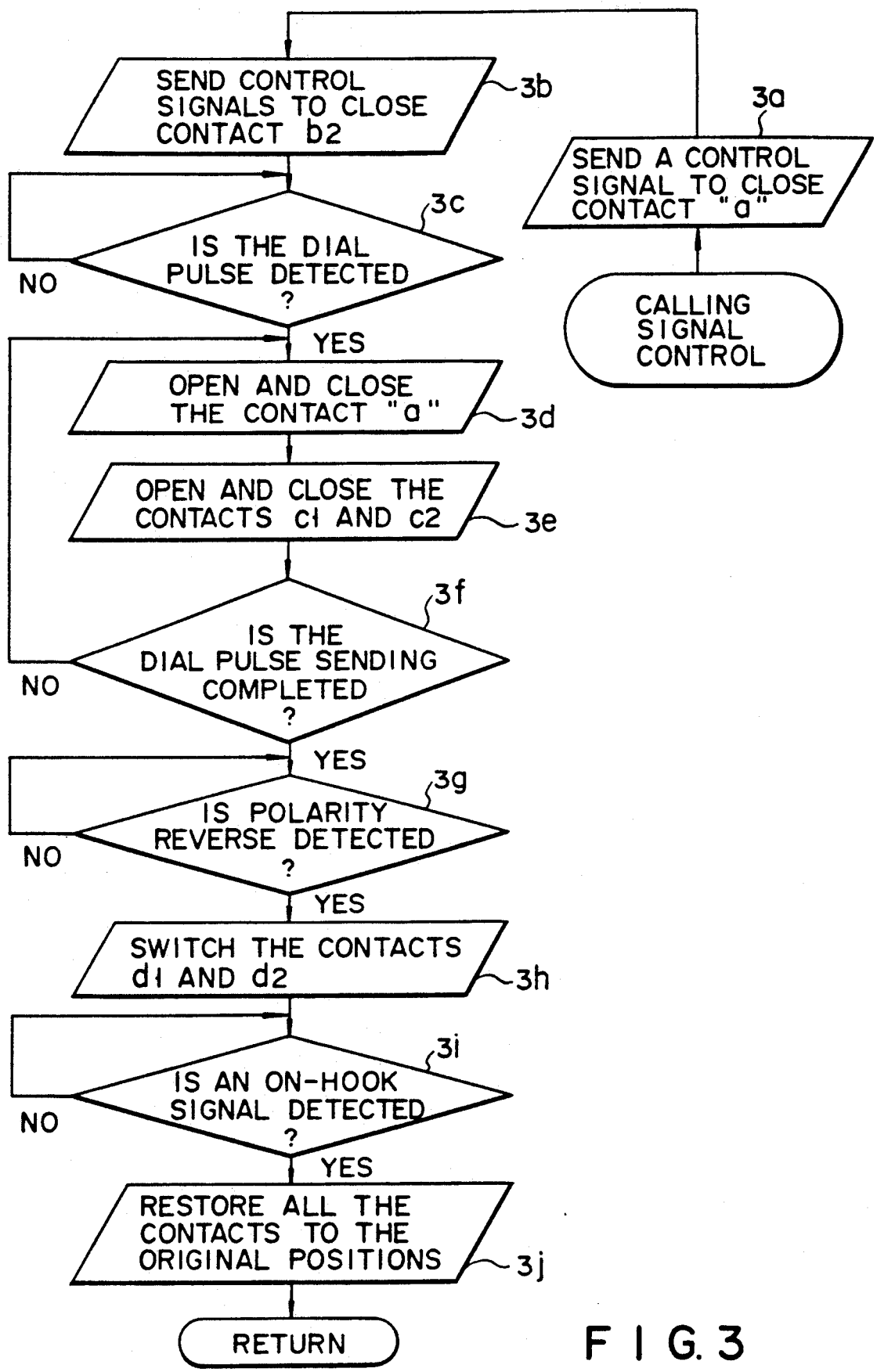

In this way, the repeater 31 and the telephone set 20 are in a stand-by state. In this state, the CPU 48 repeatedly executes tasks to supervise the detection of a ringing signal and a seizure signal in steps 2b and 2c. At this time, if a speaker picks up a handset of the telephone set 20 to communicate with another extension telephone, a DC loop is formed in the line 42. The formation of the DC loop is detected in the form of a change in a line current by the DC loop signal detector 43. In other words, a seizure signal from the telephone set 20 is detected. At this time, the CPU 48 recognizes a start of the telephone set 20 in step 2c, and its control enters a routine for a calling signal control as shown in FIG. 3.

The calling signal control follows. To start, in step 3a, the CPU 48 produces a control signal to close the dial contact "a" to the driver 49. In a step 3b, the CPU 48 produces control signals to close the contacts b1 and b2 to the driver 49. In response to these control signals, the driver 49 is driven to close these contacts "a", b1 and b2, so that a DC loop including the polarity reverse detector 46 is formed in the line 41. When this DC loop is formed, the PBX 10 is driven and sends a dial tone (DT) to the line 41. The DT goes through the lines 41 and 42 and reaches the telephone set 20.

The speaker confirms the DT from the PBX, and operates dial keys to enter a telephone number of the intended extension telephone. The dial pulses representing the telephone number are sent from the telephone set 20 to the line 42. The dial pulse is transferred through the interruption of the DC loop formed in the DC loop formed in the line 42. The dial pulse signal is detected by the DC loop detector 43 in the repeater 31. The CPU 48 supervises if the detector 43 detects the dial pulse, in step 3a. If the CPU 48 recognizes the detection of the dial pulse by the detector, the CPU 48 proceeds to step 3d. In this step, the CPU 48 sends a control signal to open and close the dial contact "a" in synchronism with the on/off of the detected signal, to the driver 49. The contact "a" opens and closes itself and consequently the DC loop in the line 41, thereby to generate new dial pulses. The dial pulses formed anew are transmitted through the line 41 to the PBX 10. In step 3e, the CPU 48 applies to the driver 49 a control signal to open and close the shunt contacts c1 and c2 in synchronism with the opening and closing operations of the dial contact "a". Accordingly, the shunt contacts c1 and c2 open and close in synchronism with the open and close of the dial contact "a". As a result, the unnecessary pulses to the telephone set 20 are blocked, and the line resistance of the line 41 is kept at a predetermined value.

The PBX 10 connects the line 40 extending to the original telephone set 20 to the line 40 (not shown) extending to the telephone set as specified by the telephone number. Then, the PBX 10 sends a ringing signal to the called telephone set and returns a ring back tone to the calling telephone set 20.

In the called telephone side, a speaker picks up a hand set of the called telephone, so that the called telephone set sends a on-hook signal to the PBX 10. In response to the on-hook signal, the PBX 10 inverts the polarity of the voltage in the DC loop formed in the extension line 41. The polarity reverse is detected by the polarity reverse detector 46 in the repeater 31. The CPU 48 detects the completion of the dial pulse sending in step 3f, and supervises if the polarity reverse is detected, in step 3g. Following the detection of the polarity reverse, the CPU 48 outputs a control signal to switch the polarity reverse contacts d1 and d2, in step 3h. The contacts d1 and d2 are turned to the fixed contacts which are normally open. As a result, the polarity of the voltage in the line 42 is inverted. And a speech path is set up between the calling telephone set 20 and the called one, to allow a speech between the calling and called parties.

After the speech ends, the calling party sets the hand set to the telephone set 20 to generate an on-hook signal. With the on-hook signal, the DC loop in the line 42 is open. The opening of the DC loop is transferred in the form of a change in the line current to the repeater 31, and is detected by the DC loop signal detector 43. At this time, the CPU 48 supervises if the on-hook signal is detected, in step 3i. If the CPU 48 recognizes the detection of the on-hook signal by the detecting signal coming from the DC loop signal detector 43, the CPU 48 goes to step 3j. In this step, the CPU 48 transfers a control signal to release or restore all of the contacts "a", b1, b2, d1 and d2 to the original positions, to the driver 49. By the control signal, these contacts are released to the original or initial positions, and the repeater 31 is placed in a stand-by mode.

Figure 4:
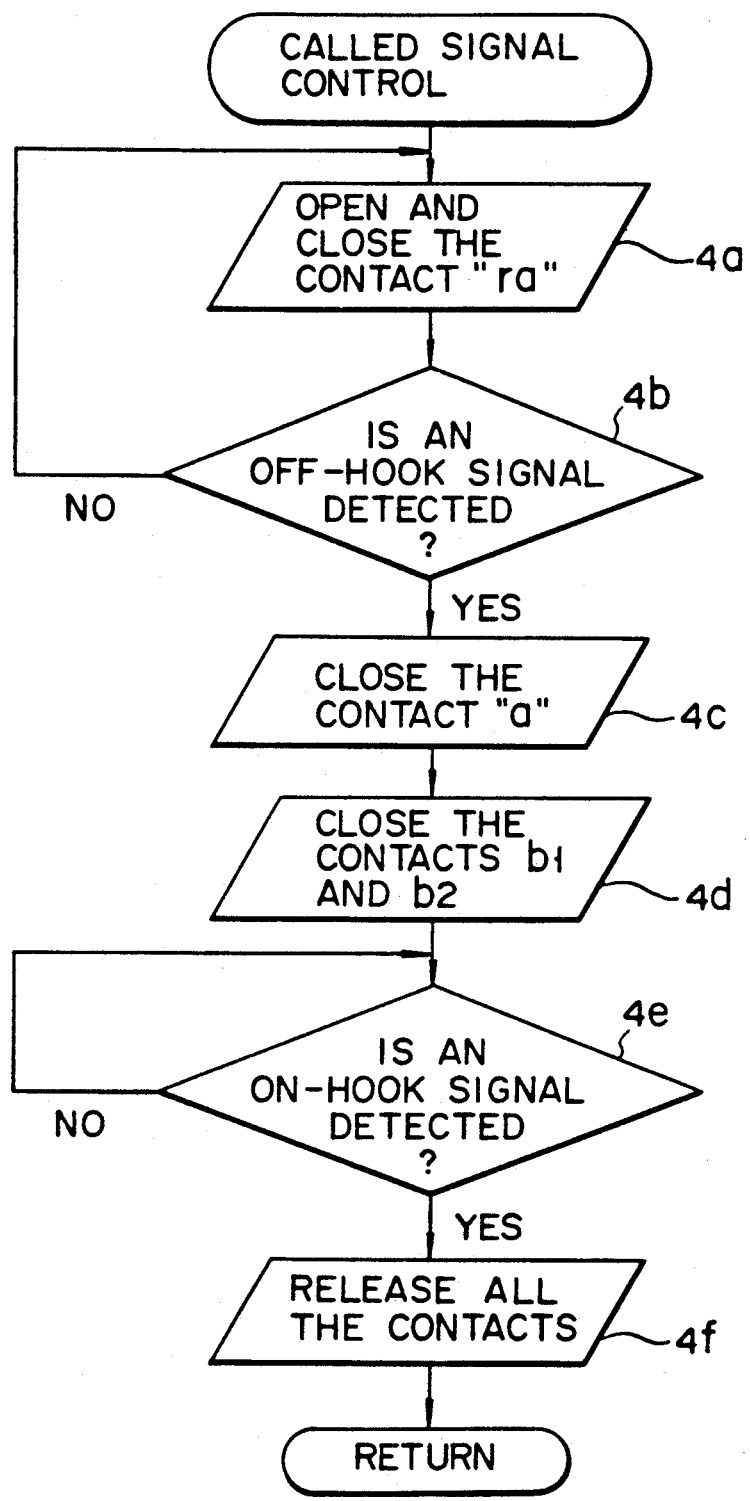

Let us consider a case that in the stand-by mode of the repeater 31, the PBX sends a ringing signal to the telephone set 20. In this case, the ringing signal is detected by the ringing signal detector 47 of the repeater 31. The CPU 48 recognizes in step 2b the arrival of the ringing signal by the detecting signal derived from the ringing signal detector 47. The CPU 48 proceeds to a called signal routine shown in FIG. 4.

In step 4a of the subroutine, the CPU 48 outputs a control signal to open and close the ringing signal send contact "ra", to the driver 49. By the control signal, the contact "ra" is switched in a manner that 1-sec. continuation and 2-sec. interrupt are alternately repeated. Accordingly, a ringing signal (16 Hz) generated by the call signal generator 51 is modulated by such a close-open operation of the contact "ra" into a pseudo-ringing signal. The pseudo-ringing signal is sent to the telephone set 20 and rings a bell, for example.

After hearing the ringing, a speaker picks up a handset of the telephone set 20, so that a DC loop is formed in the line 42. The formation of the DC loop is transferred in terms of a change in the line current to the repeater 31 In the repeater 31, it is detected by the off-hook detector 50 or the DC loop signal detector 43. The CPU 48 supervises if the off-hook is detected, in step 4b. The CPU 48 recognizes the off-hook by the detecting signal from the detector 50 or 43, and goes to step 4c where it outputs to the driver 49 a control signal to close the dial contact "a". In step 4d, control signals to close the answer contacts b1 and b2 are outputted to the driver 49. These contacts "a", b1 and b2 are closed to form a DC loop in the line 41. The formation of the DC loop is transferred as an answer by the telephone set 20 to the PBX 10. In response to this, the PBX 10 inverts a polarity of the voltage in the extension line connecting to the calling signal telephone set 20, and sets up a speech path between the calling signal and called signal telephone sets. Both parties are allowed to make a conversation through the speech path.

After the conversation ends, the speaker puts back the handset, to open the DC loop in the line 42. The opening of the DC loop is transferred to the repeater 31, and this is detected by the DC loop signal detector 43. In step 4e, the CPU 48 recognizes the on-hook. After recognizing the on-hook signal, the CPU 48 outputs to the driver 49 a control signal to release all of the contacts "a", b1 and b2, in step 4f. The contacts are released and the repeater 31 is in a stand-by state.

As seen from the foregoing description, the terminal repeater according to the above-mentioned embodiment of the present invention is capable of reliably repeating a ringing signal from the PBX 10, dial pulses, and seizure and answer signals from the telephone set 20, in addition to the speech signal.

Additionally, the terminal repeater disconnects the 2-wire line 41 connecting to the PBX 10 from the 2-wire line 42 connecting to the telephone set 20, by the capacitors cc1 and cc2, in a DC mode. A DC power required for the repeater 31 is regenerated by the combination of the battery 45 and the constant current circuit 44. The DC loop signals such as dial pulses, seizure and off-hook signals are also regenerated by the combination of the DC loop signal detector 43, and the dial and answer contacts "a", b1 and b2, and the shunt contacts c1 and c2. The regenerated DC loop signals are applied to the PBX 10. With these features, even in a telephone set that is remotely located from the PBX and whose line resistance RL is great and hence line current IL is small, a necessary DC power is always secured and therefore, the telephone set is always normally operable. When the DC loop signals derived from the telephone set are in a low level and/or distorted, the repeater detects those signals and regenerates them and transfers the regenerated ones to the PBX. Accordingly, the regenerated DC loop signals have normal levels and contain no distortion. These DC loop signals ensure a normal exchange operation of the PBX. Use of the terminal repeater enables the extension line to extend.

2nd Embodiment

A configuration of a second embodiment of a terminal repeater according to the present invention is illustrated in FIG. 5. In the figure, like reference symbols are used for designating like or equivalent portions in FIG. 1.

The terminal repeater is featured by a line current detector 61 and a threshold controller 62. In the repeater, the line current detector 61 is inserted between the terminal 42b of the line 42 connecting to the telephone set 20 and the polarity reverse contact d2. The line current detector 61 detects a line current IL of the line 42 when a DC loop is formed in the line 42, and feeds an analog line current as detected to the threshold controller 62. The threshold controller 62 generates a threshold control signal based on the analog voltage from the line current detector 61.

Figure 6:
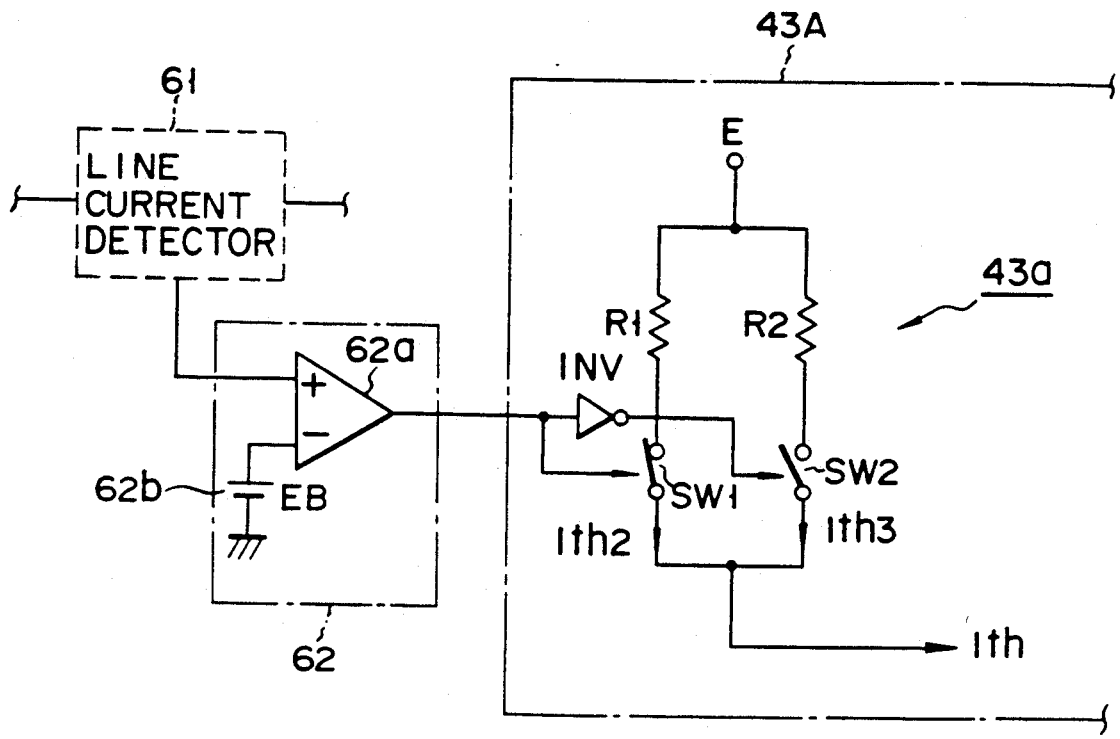
FIG. 6 shows a circuit diagram showing a major part of the repeater of FIG. 5.

Details of the line current detector 61, the threshold controller 62, and a threshold value generator 43a contained in the DC loop signal detector 43A are illustrated in FIG. 6. As shown, the threshold controller 62 is made up of a comparator 62a and a reference source 62b for providing a reference voltage EB. The comparator 62a compares the analog voltage from the line current detector 61 with the reference voltage EB. When the analog voltage is above the reference voltage EB, the comparator produces a threshold control signal in an "H" level. When the analog voltage is below the reference voltage EB, the comparator produces a thresh-old control signal in an "L" level. The reference voltage EB is preset to be a value corresponding to approximately the half of the line current ILmax when the extension line 42 has the minimum line resistance RLmin.

The threshold value generator 43a is made up of two series circuits, one containing a resistor R1 and a switch SW1 and the other containing a resistor R2 and a switch SW2. These two series circuits are connected in parallel with a power source E. The values of these resistors R1 and R2 are so selected as to provide different threshold values Vth2 and Vth3. The switches SW1 and SW2 may be switching transistors, for example. The switch SW1 is turned on when the threshold control signal of the threshold controller 62 is in an "H" level. The switch SW2 is turned on when an output signal of an inverter INV receiving the threshold control signal is in an "H" level. These switches alternately operate in accordance with the threshold control signal. Accordingly, the threshold voltages Ith2 and Ith3 are selectively outputted from the threshold value generator 43a. The threshold value Ith2 is selected at approximately the half of the line current ILmax when the line 40 has the minimum line resistance RLmin. The threshold value Ith3 is selected at approximately the half of the line current ILmin when the line 40 has the maximum line resistance RLmax.

In a stand-by state, the telephone set 20 produces an off-hook signal, and a DC loop is formed in the line 42. In this case, a line current IL based on a line resistance RL flows in the line 42. The line current IL is detected by the line current detector 61. The detected current is converted into an analog voltage and compared with the reference voltage EB in the comparator 62a in the threshold controller 62. The comparator 62 produces a threshold control signal based on the result of the comparison. The threshold value generator 43a of the DC loop signal detector 43A produces the threshold value Ith2 or Ith3 in accordance with the control signal, and the DC loop signals are detected by using the produced threshold value.

Let us consider a case that a line length of the line 42 is short, and the line 42 has the minimum line resistance RLmin and the maximum line current ILmax. In this case, a detecting voltage of the line current detector 61 is above the reference voltage EB. Accordingly, the comparator 62a of the threshold controller 62 produces a threshold control signal in an "H" level. In the threshold value generator 43a of the DC loop signal detector 43A, the switch SW1 is closed and the switch SW2 is opened. Therefore, the threshold value Ith2 as defined by the resistor R1 is selected and produced. Subsequently, the DC loop detector 43A detects the DC loop signals, such as a seizure signal, dial pulses and an off-hook signal, by using the threshold value Ith2. In the detection, when a dial pulse "h" containing a relative large distortion in the vicinity of the break level as shown in FIG. 7B arrives, the detector will never detect the distorted pulses and will produce a detecting signal "1" whose make ratio is approximately equal to that of the dial pulse "h", because the threshold value Ith2 is set at a value much higher than the break level Ibk. Accordingly, in synchronism with the detecting signal "1", the CPU 48 produces a control signal, so that the dial contact "a" is opened and closed. As a result, pseudo-dial pulses whose make ratio is approximately equal to that of the dial pulse "h" coming from the telephone set 20, are produced and transmitted to the PBX 20. The PBX 20 receives the pseudo-dial pulses, exactly recognizes the calling telephone set 10 and makes a correct exchange connection.

Let us consider another case that the line 42 is long, and it has the maximum line resistance RLmax, and the minimum line current ILmin. In this case, the detecting voltage of the line current detector 61 is smaller than the reference voltage EB. The comparator 62a of the threshold controller 62 produces an "L" level control signal. Accordingly, in the threshold value generator 43a in the DC loop signal detector 43A, the switch SW1 is open and the switch SW2 is closed. Under this condition, the threshold voltage Ith3 as defined by the resistor R2 is selected. In the DC loop signal detector 43A, the seizure signal, dial pulses and off-hook signal are detected by the threshold value Ith3. Therefore, if dial pulses "i" based on the small line current IL as shown in FIG. 7B comes from the telephone set 20, the detector detects the dial pulses "i" without fail. Even if a relatively large distortion exists in the break level of the dial pulse "i" as shown, there is no danger that the distorted wave is mistakenly detected, because in general, most of the waveform distortion exists in a small line current that is approximately ½ the minimum line current ILmin. Consequently, the DC loop signal detector 43A produces a detecting signal "m" whose make ratio is approximately equal to that of the dial pulse "i" coming from the telephone set 20. In synchronism with the detecting signal "m", the CPU 48 produces a control signal to open and close the dial contact "a", so that pseudo-dial pulses to be transmitted to the PBX 10 are in a high level and has a make ratio approximately equal to that of the dial pulses from the telephone set 20. As a result, the PBX 10 exactly recognizes the calling telephone set and makes a correct exchange connection.

If the threshold value is fixed at a proper level Ith1, a distorted wave of the dial pulse "h" will possibly be detected as shown in FIG. 7A. If detected, an error detecting signal "j" is produced. The signal "j" would improperly open and close the dial contacts "a", to regenerate dial pulses unanalogous to those coming from the telephone set 20. Accordingly, when receiving such incorrect dial pulses, the PBX 10 will mistakenly recognize another telephone set as a correct telephone set, and make an exchange for the incorrect telephone set. When a make ratio of a detecting signal, even if the distorted wave is not detected, varies, a variation of the make ratio will appear a variation of the pseudo-dial pulse. The dial pulses of the varied make ratio will cause the PBX 10 to make an improper exchange connection.

To prevent the variation of the make ratio and the detection of the distorted wave of the dial pulses, the threshold value may be set in a high level Ith1' in FIG. 7A. In this case, however, the dial pulses "i" based on a small line current IL cannot be detected.

The above fact of the dial pulses are correspondingly applied to the other DC loop signals such as the seizure signal and the off-hook signal. It is possible to prevent a hooking timing error and generation of the pseudo-pulses at the time of hooking, and further to prevent improper detection of the pseudo-hooking error at the start of calling signal and at the end of conversation.

As described above, in the terminal repeater according to the instant embodiment, a line current IL in the line 42 is detected. When the line current IL is above the reference value, a larger preset threshold value Ith2 is selected. When the line current IL is below the reference value, a smaller preset threshold value Ith3 is selected. Accordingly, even in a case that the line resistance is large and the line current is small, and that a relatively large waveform distortion is contained, the repeater can exactly detect the DC loop current, while being free from a variation of the make ratio. A correct exchange operation by the PBX 10 is secured. Further, according to the present embodiment, a threshold value that is most suitable for the line resistance RL is automatically set up every extension line 42. This eliminates the need for adjusting the threshold value. Consequently, an exact repeating of the DC loop signal with no adjustment is ensured for each extension line.

Figure 8:
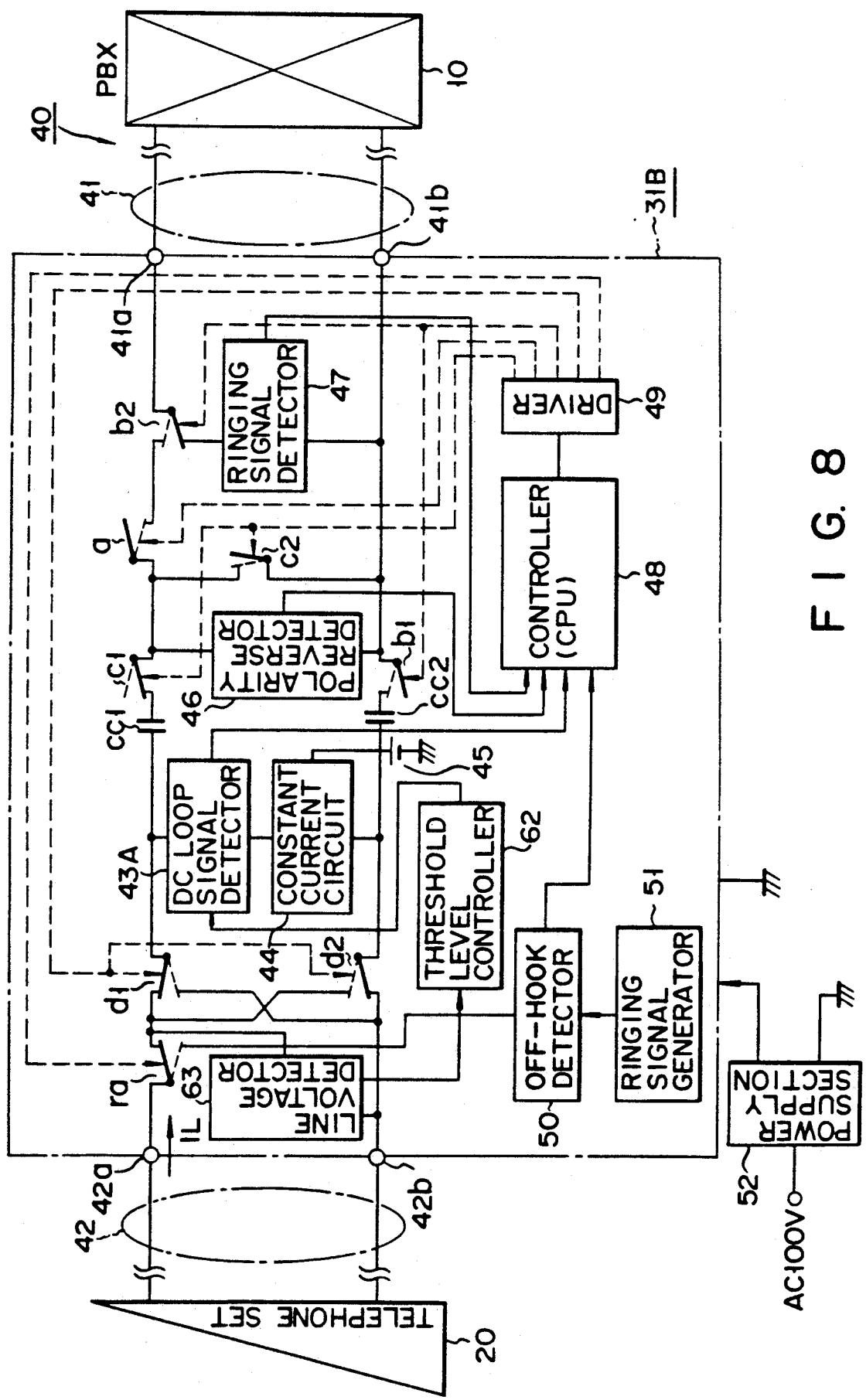
FIGS. 8 and 9 are circuit diagrams showing configurations of terminal repeaters which are modifications of the repeater of FIG. 5.

One of the possible modifications of the second embodiment as mentioned above is shown in FIG. 8. As the means to detect a DC level in the line 42, a terminal repeater 31B of the modification employs a line voltage detector 63 coupled between the two wires of the line 42.

As described above, in the second embodiment, two preset threshold values are used. In operation, either of these threshold values is selected in accordance with a line current. Alternatively, the threshold value may be continuously varied in accordance with a detected line current. One of the approaches to realize this uses a variable current circuit. An output current of the current circuit is continuously changed in accordance with a detected line current. Another approach uses a ROM storing discrete threshold values in connection with the different detected line currents. In this case, the detected currents are used as addresses to read out the threshold values. The threshold values are generated in accordance with the read out threshold values.

Figure 9:
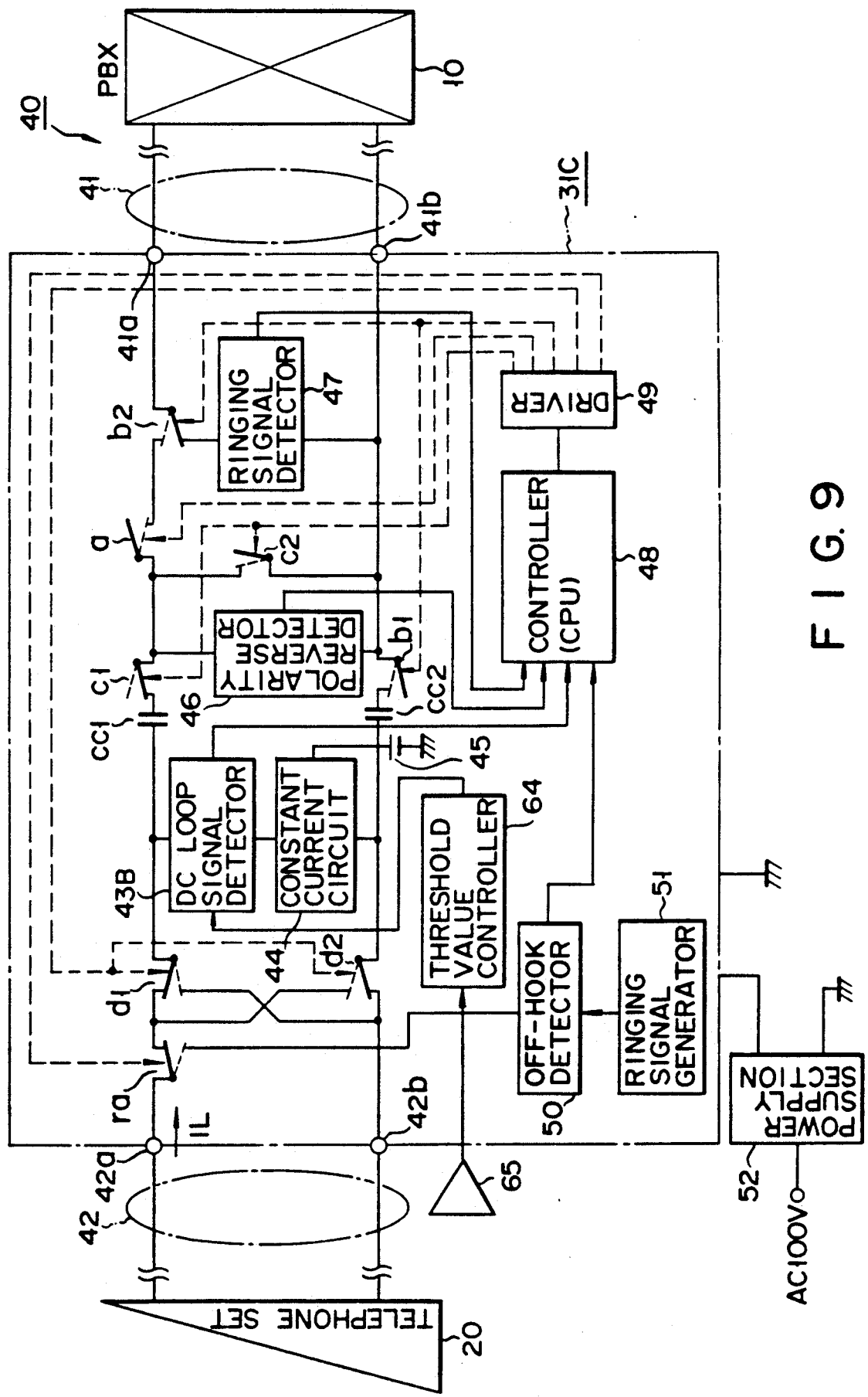

Further, the threshold values may manually be set by an operator. This may be realized by a terminal repeater 31C shown in FIG. 9. The repeater is provided with an input means 65 such as a key switch, a slide type or a rotary type switch. Appropriate threshold data is entered by the input means 65. The entered data is inputted to the threshold value generator 64. The generator 64 generates a threshold value Ith that is dependent on the entered threshold data. The threshold value Ith outputted from the circuit 64 is supplied to the DC loop signal detector 43B. In accordance with the threshold value Ith supplied from the threshold value generator 64, the DC loop signal detector 43B detects DC loop signals in the line 42.

With such an arrangement, an operator may freely select an optimum detecting threshold value as is predicted on the basis of a line length of each line. Further, the line current detector or the line voltage detector is omissible, leading to a simplified circuit arrangement of the repeater.

3rd Embodiment

Figure 10:
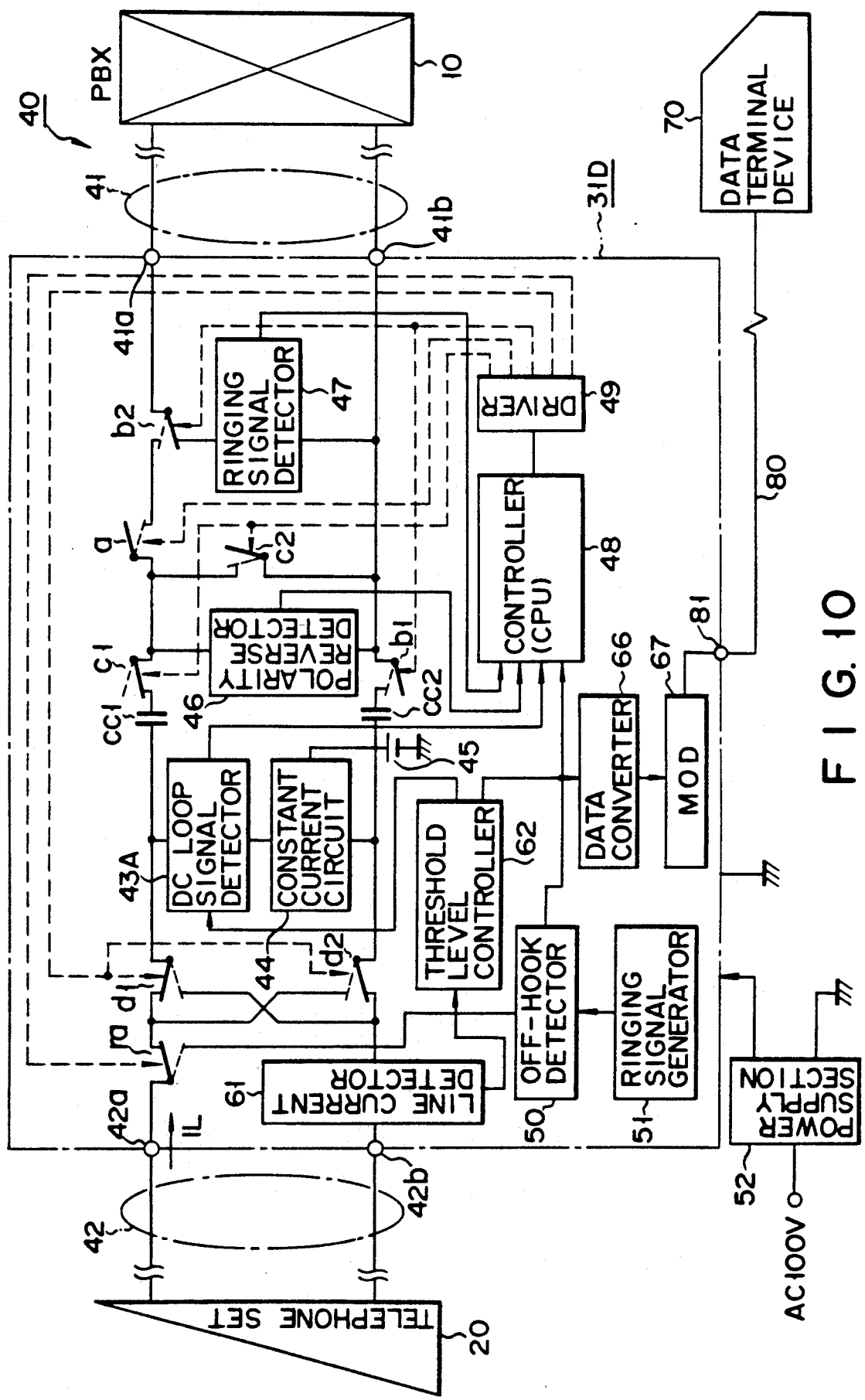
FIG. 10 is a circuit diagram showing a configuration of a terminal repeater according to yet another embodiment of the present invention.

A configuration of a terminal repeater according to a third embodiment of the present invention is illustrated in FIG. 10. In the figure, like reference symbols are used for designating like or equivalent portions in FIG. 5.

A terminal repeater 31D according to the third embodiment is featured by a data converter 66 coupled for reception with the threshold controller 62, and a modem (MOD) 81 coupled for transmission with a data terminal device 70. The data converter 66 converts a threshold control signal outputted from the threshold controller 62 into coded data suitable for data transmission. The data converter 66 transmits the coded data to the terminal device 70 installed in a network supervising center, for example, through a communication line 80. A maintenance line, which is provided separately from the extension line 40, may be used for the communication line 80. The terminal device 70 decodes the coded data sent from the terminal repeater 31D and transfers the decoded data to a host computer (not shown).

According to the third embodiment as mentioned above, line conditions of all the extension lines containing the terminal repeaters 31D can be systematically and remotely controlled in the network supervising center. An effective network management is possible.

It is evident that the threshold value Ith generated by the threshold value generator 43a of the DC loop current detector 43A may be encoded, in place of the threshold control signal. Alternatively, a detected line current from the line current detector 61 may be encoded for the same purposes.

4th Embodiment

A configuration of a terminal repeater according to a fourth embodiment of the present invention is illustrated in FIG. 11. In the figure, like reference symbols are used for designating like or equivalent portions in FIG. 5.

A terminal repeater 31E according to the fourth embodiment configured as shown in FIG. 11 is featured by a DC power source circuit 45A providing different DC voltages and a DC voltage controller 68. The DC voltage controller 68 receives a detected line current IL outputted from the line current detector 61, and transfers a DC voltage control signal based on the received voltage to the DC power source circuit 45A.

Figure 12:
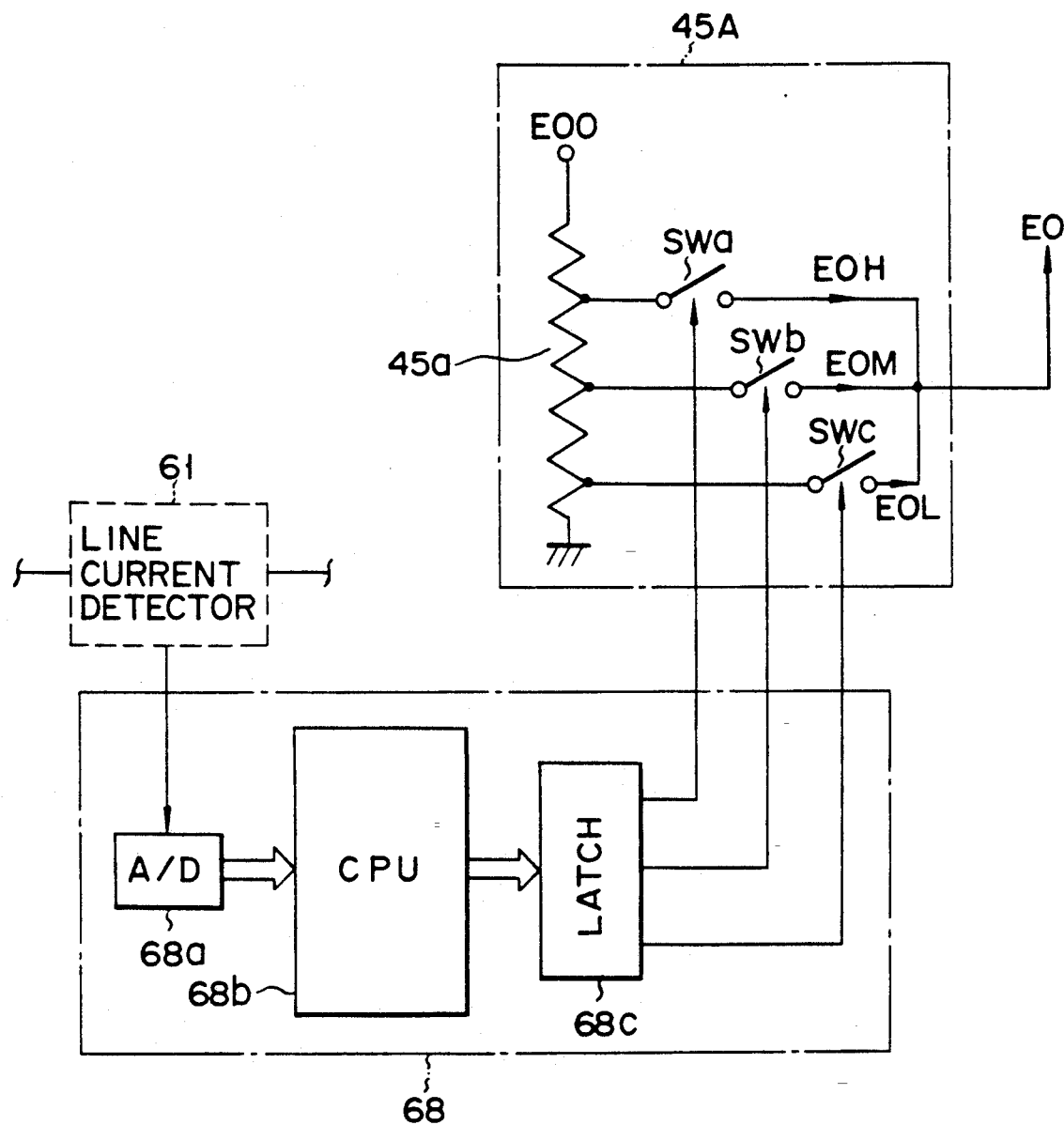
FIG. 12 shows a circuit diagram showing a major part of the repeater of FIG. 11.

FIG. 12 shows an exemplar circuit arrangement including the DC voltage controller 68 and the DC power source circuit 45A. In the DC power source circuit 45A, a resistor 45a having a plurality of taps is connected between a DC power source Eoo and ground. Different DC voltages EOH, EOM, EOL are respectively derived from the taps of the resistor 45a through switches SWa, SWb and SWc. These switches may be switching transistors.

The DC output voltages EOH, EOM and EOL may be selected in the following mathematical procedure. Assuming that a DC output voltage is EO, line resistance RL, DC resistance of the telephone set 20 is RTEL, minimum operating voltage ETEL, and a power loss of the DC loop signal detector and the constant current circuit 44 is ELOSS, a minimum line current Imin is given by ILmin=(EO−ETEL−ELOSS)/(RL+RTEL)

An ordinary value of the minimum line current ILmin is about 0.02 A. Therefore, $$\begin{aligned}
EOL &= IL(RLL + RTELmax) + ETEL + ELOSS \\
&= 0.02(1500 + 300) + 5 + 2 \\
&= 43\ V \\
EOM &= IL(RLL + RTELmax) + ETEL + ELOSS \\
&= 0.02(2250 + 300) + 5 + 2 \\
&= 58\ V \\
EOH &= IL(RLL + RTELmax) + ETEL + ELOSS \\
&= 0.02(3000 + 300) + 5 + 2 \\
&= 73\ V
\end{aligned}$$

The DC voltage controller 68 is made up of an analog to digital (A/D) converter 68a for digitizing a voltage corresponding to a detected line current IL outputted from the line current detector 61, a microcomputer (CPU) 68b, and a latch circuit 68c. Under control of a DC voltage control program the CPU 68b receives the detected line current from the A/D converter 68a. The CPU compares the detected line current with the minimum line current ILmin. Further, the CPU 68a generates a switch control signal to drive one of the switches SWa, Swb and SWc, under control of a DC voltage control program stored therein.

A control procedure of the DC voltage controller 68 thus arranged will be described with reference to FIG. 13.

When power is supplied to the terminal repeater 31E, the CPU 68b initializes the CPU 68b per se. Upon the initialization, the CPU 68b transfers a switch control signal to turn on the switch SWc alone in the DC power source circuit 45A. The switch control signal is applied through the latch circuit 68c to the switch SWc. The switch SWc is turned on to allow the DC voltage EOL (43 V) to pass from the DC power source circuit 45A to the constant current source 44. The voltage EOL from the constant current circuit 44 is supplied through the DC loop signal detector 43A to the line 42. Thus, in an initial stage of the operation of the terminal repeater 31E immediately after the power is supplied to the repeater, the lowest DC voltage EOL of those preset DC voltages is supplied to the line 42. In this stage, when a speaker picks up the handset of the telephone set 20, a DC loop having the lowest DC voltage EOL is set up in the line 42. The CPU 68b checks if the DC loop is formed in the line 42, in step 13b. If the answer is YES, the CPU 68b receives the detected line current IL from the A/D converter 68a, in step 13c. In the next step 13d, the CPU 68b compares the detected line current IL with the preset minimum line current ILmin. When the detected line current IL is above the minimum line current ILmin, the CPU 68b decides that a proper power voltage has been supplied to the line 42, and terminates the control of the DC voltage.

When the detected line current IL is smaller than the minimum line current ILmin, the CPU 68b decides that the DC voltage EOL is below a required value, and goes to step 13e. In this step, the CPU produces a control signal to turn on only the switch SWb. It allows the DC voltage EOM (58 V) higher than the voltage EOL to pass therethrough to the line 42.

The change of the DC voltage is completed in this way. Then, in step 13f, the CPU 68b receives a detected line current IL from the A/D converter 68a after the DC voltage is changed. In the next step 13g, the CPU 68b compares the detected line current IL with the minimum line current ILmin. When the detected current is above the minimum line current ILmin, the CPU 68b decides that the DC voltage EOM is a proper voltage, and terminates the task of the DC voltage control. When the line resistance RL is very large and the CPU 68b decides that the detected line current IL is below the minimum line current ILmin, control goes from step 13g to 13h. In step 13h, the CPU 68b produces a control signal to turn on the switch SWa alone. In the DC power source 45A, only the switch SWa is turned on, so that the DC voltage EOH (73 V) higher than the voltage EOM is supplied to the line 42.

Figure 14:
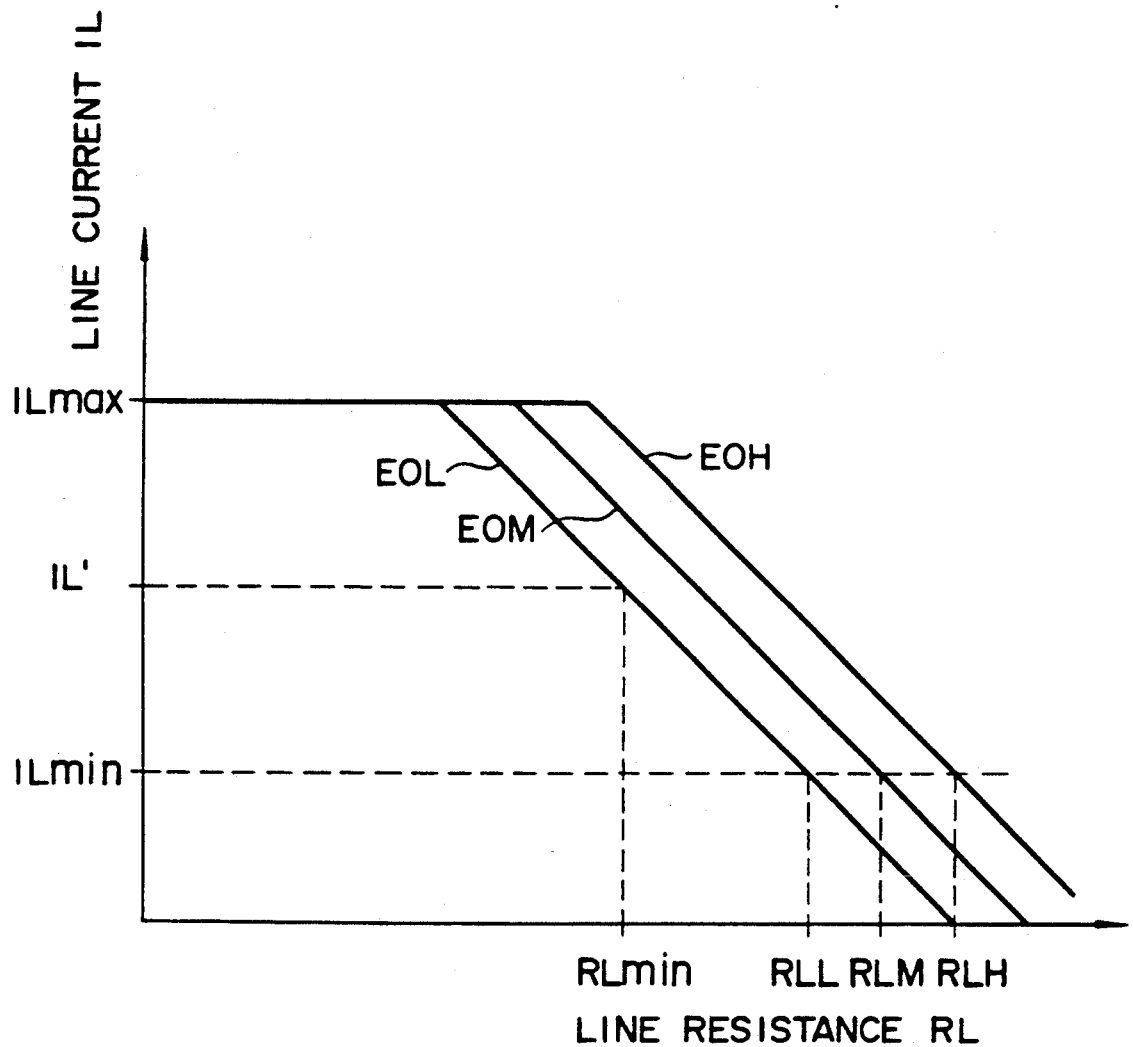
FIG. 14 shows a graphical representation of line characteristics for explaining the operation of the repeater shown in FIG. 11.

A graph shown in FIG. 14 illustrates a line current vs. line resistance with parameters of DC voltages EOL, EOM and EOH.

As described above, the 4th embodiment of a terminal repeater according to the present invention is so arranged that a line current IL is detected, and a DC voltage EO providing the detected line current above a minimum line current ILmin is generated by the DC power source circuit 45A. With this arrangement, even in a situation that the line 42 has a large line resistance RL, a line current above the minimum line current ILmin for the telephone set 20 can be obtained. Further, the DC power voltage is automatically set by the DC voltage controller 68. This eliminates a manual work to set the power voltage. Therefore, an optimum DC power voltage can be supplied to any extension line, not requiring any adjustment.

In the instant terminal repeater, the DC voltage EO is controlled so that it is stepwise changed from the low voltage EOL to EOH. In the DC voltage EO for the minimum line current ILmin, an excessive voltage will never be selected. This fact implies that the telephone set capable of withstanding the highest DC voltage EOH is not always selected. If situation allows, the telephone sets operable within the medium DC voltage EOM may be used.

It is evident that many modifications of the 4th embodiment exist. For example, the DC power source circuit 45A may provide any other number of voltages than three, e.g., two different voltages or four or more different voltages. Further, the DC voltage may be changed continuously, not stepwise. The DC voltage controller may be constructed with a combination of a comparator and logic circuits, in place of the CPU. The power voltage may be set manually, not automatically. While the telephone set is used for the terminal device in the above-mentioned embodiments, a facsimile or any other terminal device may be used. It is understood that the types of the exchange and communication line, and the circuit arrangement of the repeater may be changed and modified within the scope of the present invention.

What is claimed is:

1. A terminal repeater placed in at least one communication line connecting an exchange with at least one terminal device, said terminal device having means for generating a first DC loop signal in response to the connecting condition of a DC loop formed on the communication line, and for supplying said first DC loop signal to said exchange, the terminal repeater comprising:

DC cut-off means for passing AC signals flowing through said communication line and cutting off DC signals flowing through said communication line;

DC power supply means, provided between said DC cut-off means and said terminal device, for supplying a DC power to said terminal device through said communication line between said DC cut-off means and said terminal device, said DC power corresponding to a DC power supplied through said communication line from said exchange;

DC loop signal detecting means for comparing a threshold level with a level of said first DC loop signal transmitted from said terminal device to said exchange, and for generating a DC loop detecting signal corresponding to said first DC loop signal;

DC loop signal transmitting means for generating a second DC loop signal analogous to said first DC loop signal transmitted from said terminal device in response to said DC loop detecting signal derived from said DC loop signal detecting means through the communication line between said DC cut-off means and said exchange, and transmitting said second DC loop signal to said exchange;

DC level detecting means, provided between said DC cut-off means and said terminal device, for detecting a DC level of said communication line connected to said terminal device and for producing a DC level detecting signal; and threshold control means for setting said threshold level to a value lower by a predetermined value than the DC level of said communication line, in accordance with each DC level detecting signal produced by said DC level detecting means.

2. The terminal repeater according to claim 1, wherein said DC level detecting means detects the current of the DC loop signal supplied from said terminal device through the communication line.

3. The terminal repeater according to claim 1, wherein said DC level detecting means detects the voltage of the DC loop signal supplied from said terminal device through the communication line.

4. The terminal repeater according the claim 1, wherein said threshold control means sets said threshold level to about half of the DC level of said communication line, in accordance with each DC level detecting signal produced by said DC level detecting means.

5. A terminal repeater placed in at least one communication line connecting an exchange with at least one terminal device, said terminal device having means for generating a first DC loop signal in response to the connecting condition of a DC loop formed on the communication line, and for supplying said first DC loop signal to said exchange, the terminal repeater comprising:

DC cut-off means for passing AC signals flowing through said communication line and cutting off DC signals flowing through said communication line;

DC power supply means, provided between said DC cut-off means and said terminal device, for supplying a DC power to said terminal device through said communication line between said DC cut-off means and said terminal device, said DC power corresponding to a DC power supplied through said communication line from said exchange;

DC loop signal detecting means for comparing a threshold level with a level of said first DC loop signal transmitted from said terminal device to said exchange, to generate a DC loop detecting signal corresponding to said first DC loop signal;

DC loop signal transmitting means for generating a second DC loop signal analogous to said first DC loop signal transmitted from said terminal device in response to said DC loop detecting signal derived from said DC loop signal detecting means, through the communication line between said DC cut-off means and said exchange, and transmitting said second DC loop signal to said exchange;

DC level detecting means, provided between said DC cut-off means and said terminal device, for detecting a DC level of the communication line connected to said terminal device and for producing a DC level detecting signal;

threshold control means for setting said threshold level to a value lower by a predetermined value than the DC level of said communication line, in accordance with each DC level detecting signal produced by said DC level detecting means; and data transmitting means for transmitting numerical data representing the threshold level set by said threshold control means.

6. The terminal repeater according to claim 5, wherein said data transmitting means transmits, instead of numerical data representing the set threshold level, numerical data corresponding to the DC detection level of the communication line detected by said DC level detecting means.

7. A terminal repeater placed in at least one communication line connecting an exchange with at least one terminal device, said terminal device having means for generating a first DC loop signal in response to the connecting condition of a DC loop formed on the communication line, and for supplying said first DC loop signal to said exchange, the terminal repeater comprising:
   DC cut-off means for passing AC signals flowing through said communication line and cutting off DC signals flowing through said communication line;
   DC power supply means, provided between said DC cut-off means and said terminal device, for supplying a DC power to said terminal device through said communication line between said DC cut-off means and said terminal device, said DC power corresponding to a DC power supplied through said communication line from said exchange;
   DC loop signal detecting means for comparing a threshold level with a level of said first DC loop signal transmitted from said terminal device to said exchange, to generate a DC loop detecting signal corresponding to said first DC loop signal;
   DC loop signal transmitting means for generating a second DC loop signal analogous to said first DC loop signal transmitted from said terminal device in response to said DC loop detecting signal derived from said DC loop signal detecting means, through the communication line between said DC cut-off means and said exchange, and transmitting said second DC loop signal to said exchange;
   line current detecting means for detecting a line current of the communication line connecting said terminal device and producing a line current detecting signal; and
   DC power control means for controlling a DC power supplied from said DC power supply means within a predetermined value in accordance with the line current detecting signal derived from said line current detecting means.

8. A terminal repeater placed in at least one communication line connecting an exchange and at least one terminal device, said terminal device having means for generating a first DC loop signal in response to the connecting condition of a DC loop formed on the communication line, and for supplying said first DC loop signal to said exchange, the terminal repeater comprising:
   DC cut-off means for passing AC signals flowing through said communication line and cutting off DC signals flowing through said communication line;
   DC power supply means, provided between said DC cut-off means and said terminal device, for supplying a DC power to said terminal device through said communication line between said DC cut-off means and said terminal device, said DC power corresponding to a DC power supplied through said communication line from said exchange;
   DC loop signal detecting means for comparing a threshold level with a level of said first DC loop signal transmitted from said terminal device to said exchange, to generate a DC loop detecting signal corresponding to said first DC loop signal;
   Dc loop signal transmitting means for generating a second DC loop signal analogous to said first DC loop signal transmitted from said terminal device in response to said DC loop detecting signal derived from said Dc loop signal detecting means, through the communication line between said DC cut-off means and said exchange, and transmitting said second DC loop signal to said exchange;
   line current detecting means for detecting a line current of the communication line connecting said terminal device and producing a line current detecting signal;
   threshold control means for controlling said threshold level in accordance with the line current detecting signal derived from said line current detecting means; and
   DC power control means for controlling a DC power supplied from said DC power supply means within a predetermined value in accordance with the line current detecting signal derived from said line current detecting means.

9. A communication network system comprising:
   an exchange;
   a terminal device connected to said exchange through a first communication line and having means for generating a first DC loop signal in response to a connecting condition of a DC loop formed on the first communication line, and for supplying the first DC loop signal to the exchange;
   at least one terminal repeater arranged in said first communication line, and including:
   DC cut-off means for passing AC signals flowing through said first communication line and for cutting off DC signals flowing through said first communication line;
   DC power supply means, provided between said DC cut-off means and said terminal device, for supplying DC power to said terminal device through said first communication line between said DC cut-off means and said terminal device, the amount of said DC power corresponding to an amount of DC power supplied through said first communication line from said exchange;
   DC loop signal detecting means for comparing a threshold level with a level of said first DC loop signal transmitted from said terminal device to said exchange, and for generating a DC loop detecting signal corresponding to said first DC loop signal;
   DC loop signal transmitting means for generating a second DC loop signal analogous to said first DC loop signal transmitted from said terminal device in response to said DC loop detecting signal derived from said DC loop signal detecting means through said first communication line between said DC cut-off means and said exchange, and for transmitting said second DC loop signal to said exchange;
   DC level detecting means, provided between said DC cut-off means and said terminal device, for detecting a DC level of said first communication line connected to said terminal device;
   information transmitting means for transmitting information corresponding to the DC level of said first communication line detected by the DC level detecting means; and
   an information receiving device arranged outside said terminal repeater, connected to the terminal repeater through a second communication line, and including;

receiver means for receiving the information transmitted from said terminal repeater through said second communication line; and means for outputting the information received by said receiver means as data for controlling the communication network system.

10. The communication network system according to claim 9, wherein said information transmitting means includes a modem for outputting information corresponding to the DC level to the second communication line.

11. The communication network system according to claim 9, wherein the at least one terminal repeater further includes threshold control means for setting the threshold level to a value lower than the DC level of the first communication line detected by the DC level detecting means by a predetermined value.

12. The communication network system according to claim 11, wherein the information transmitting means of the at least one terminal repeater includes a modem for outputting information corresponding to the DC level to the second communication line.

* * * * *

UNITED STATES PATENT AND TRADEMARK OFFICE
CERTIFICATE OF CORRECTION

PATENT NO. : 5,086,462
DATED     : February 04, 1992
INVENTOR(S) : Tosho Oka

It is certified that error appears in the above-identified patent and that said Letters Patent is hereby corrected as shown below:

Claim 4, column 14, line 14, before "claim" change "the" to --to--.

Claim 8, column 16, line 1, change "Dc" to --DC--.

Claim 8, column 16, line 5, change "Dc" to --DC--.

Signed and Sealed this

Tenth Day of August, 1993

Attest:

MICHAEL K. KIRK

*Attesting Officer*    *Acting Commissioner of Patents and Trademarks*